(12) United States Patent　(10) Patent No.:　US 7,617,865 B2
Bazika　(45) Date of Patent:　Nov. 17, 2009

(54) HEAT EXCHANGER AND METHOD OF CONNECTING

(75) Inventor: Denis Bazika, Esslingen (DE)

(73) Assignee: Modine Manufacturing Company, Racine, WI (US)

( * ) Notice: Subject to any disclaimer, the term of this patent is extended or adjusted under 35 U.S.C. 154(b) by 137 days.

(21) Appl. No.: 11/701,757

(22) Filed: Feb. 2, 2007

(65) Prior Publication Data

US 2007/0181105 A1　Aug. 9, 2007

(30) Foreign Application Priority Data

Feb. 4, 2006　(DE) .................. 10 2006 005 106

(51) Int. Cl.
*F28D 1/04*　(2006.01)
*F28F 9/02*　(2006.01)
(52) U.S. Cl. ..................................... 165/153
(58) Field of Classification Search ............ 165/152, 165/153, 172, 173
See application file for complete search history.

(56) References Cited

FOREIGN PATENT DOCUMENTS

| DE | 4307503 | 9/1994 |
|---|---|---|
| DE | 102005058769 | 6/2007 |
| EP | 0 578 916 A2 * | 1/1994 |
| WO | WO 2005/001366 A2 * | 1/2005 |

* cited by examiner

*Primary Examiner*—Teresa J Walberg
(74) *Attorney, Agent, or Firm*—Michael Best & Friedrich LLP

(57) ABSTRACT

The invention provides a heat exchanger, such as a charge air cooler, having a connecting plate, which is arranged in a housing into which the charge air flows. Charge air flows through ducts, which are assigned to the charge air and are provided with fins. The housing includes an assembly opening into which the heat exchanger can be inserted and is to be fastened by its connecting plate, with the body of the heat exchanger likewise being fastened in the interior of the housing. The charge air cooler has end chambers for a coolant. The end chambers are connected to coolant ducts. A strip is formed in the interior of the housing between two end chambers. The strip extends over a substantial part of the length of the end chambers.

8 Claims, 3 Drawing Sheets

HEAT EXCHANGER AND METHOD OF CONNECTING

CROSS-REFERENCE TO RELATED APPLICATIONS

Priority is hereby claimed to German Patent Application No. DE 10 2006 005 106.8, filed Feb. 4, 2006, the entire contents of which is incorporated herein by reference.

FIELD OF THE INVENTION

The invention relates to a heat exchanger, such as a charge air cooler, having a connecting plate.

SUMMARY

German Patent No. DE 43 07 503 A1 discloses a charge air cooler which is constructed from heat exchanger plates, has a closure plate, and is arranged in a housing. The charge air cooler does not include fastening features located in the housing. Rather, the heat exchanger plates form the coolant ducts and the end chambers for the coolant.

German Patent Application No. DE 10 2005 058 769.0 discloses a heat exchanger which uses flat tubes as coolant ducts instead of heat exchanger plates. The end chambers of the heat exchanger are formed by simple tubes into which the flat tubes open.

Current heat exchangers typically permit the charge air to also flow through the region in which the end chambers for the coolant are situated. Heat exchange is not particularly intensive or efficient in this region.

The present invention provides a heat exchanger having improved fastening features. In some embodiments, the heat exchanger provides efficient heat exchange between first and second working fluids.

In some embodiments, the heat exchanger includes strips formed in the interior of a housing. The strips can extend between two end chambers over at least a substantial part of the length thereof.

In some embodiments, the heat exchanger can easily be inserted into the housing from above, and can be fastened in the housing, in the manner of a cassette. The strips also have the effect that the charge air cannot flow through that region in which the end chambers for the coolant are situated. The heat exchange is not particularly intensive in this region because there are often no fins situated in this region. The heat exchanger of the present invention can also include relatively broad design tolerances.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
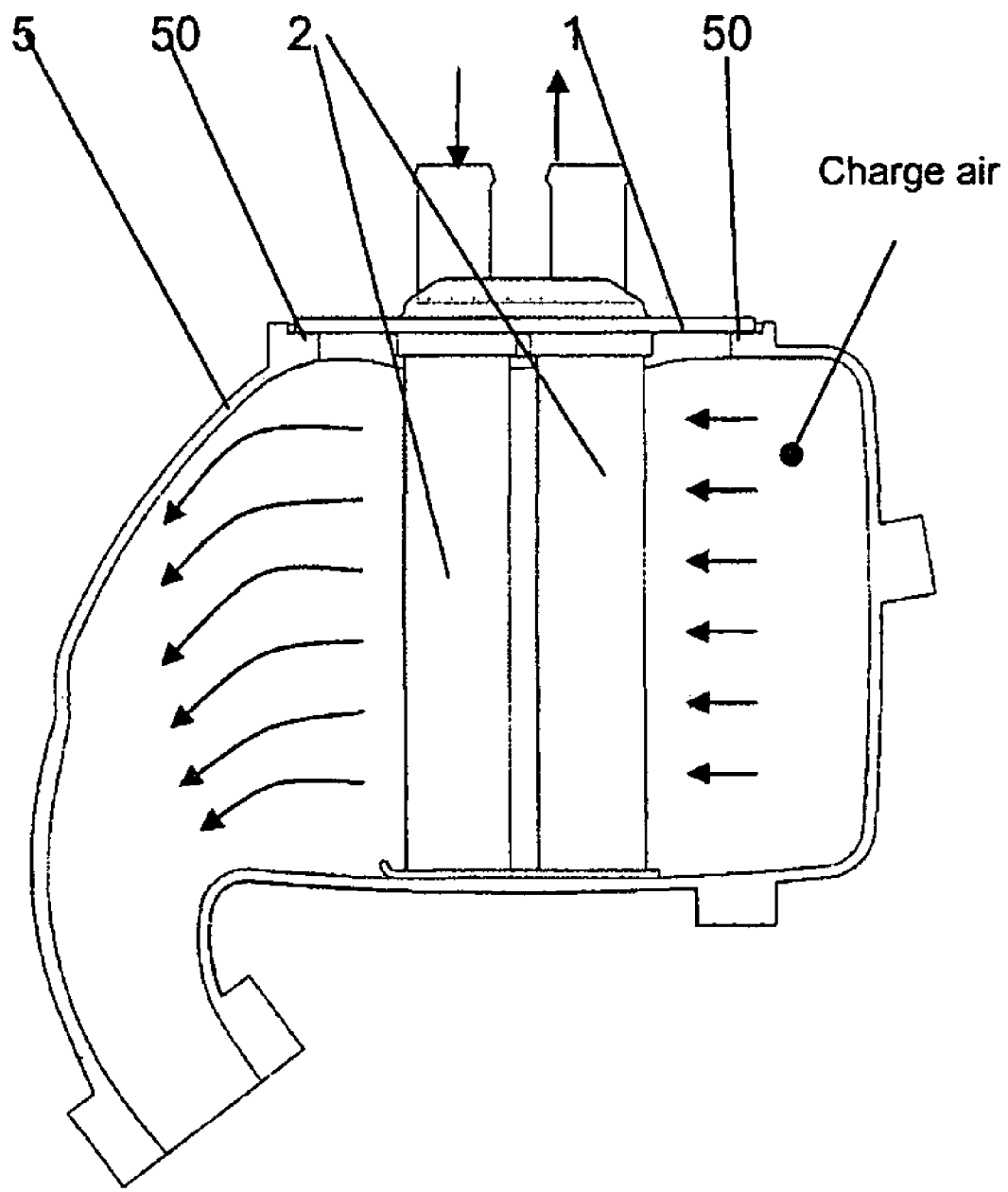
FIG. 1 shows a heat exchanger supported in a housing according to some embodiments of the present invention.
Figure 2:
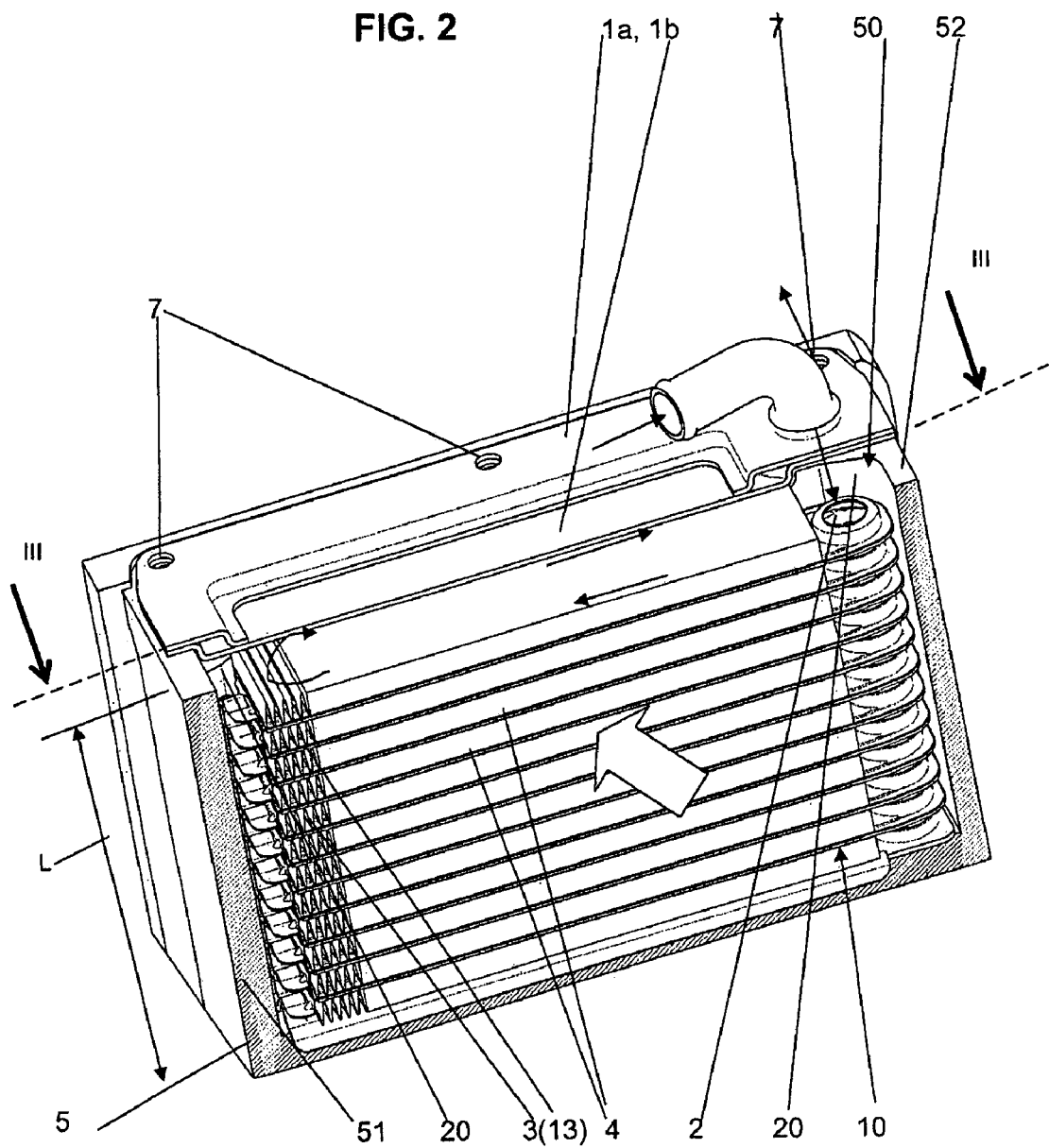
FIG. 2 is a perspective view of the heat exchanger shown in FIG. 1.
Figure 3:
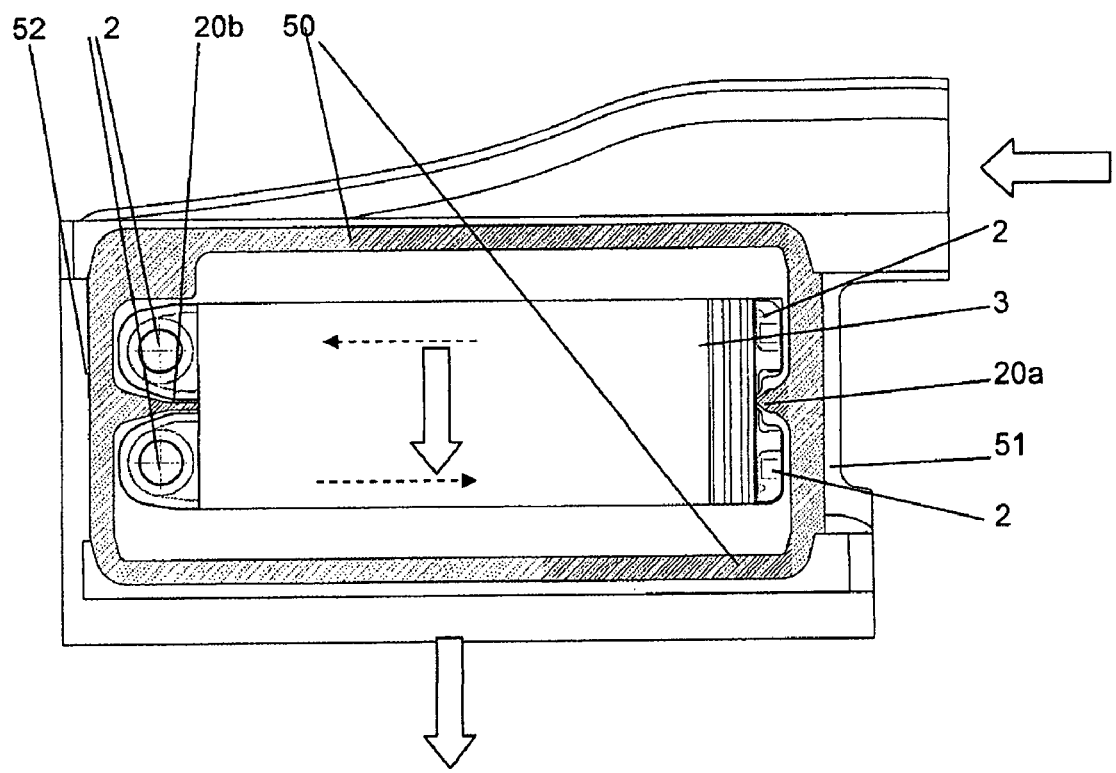
FIG. 3 is a cross-sectional view of the heat exchanger shown in FIG. 1.

In the illustrated embodiment of FIGS. 1-3, the heat exchanger is configured as a charge air cooler in which charge air is cooled by engine coolant from a motor vehicle engine (not shown). In other embodiments, the heat exchanger can operate as a condenser. In addition, the heat exchanger can be used in other applications, such as, for example, in electronics cooling, industrial equipment, vehicular applications, and the like. In addition, it should be appreciated that the heat exchanger of the present invention can take many forms, utilize a wide range of materials, and can be incorporated into various other systems.

In the illustrated embodiment of FIGS. 1-3, the heat exchanger includes a two-part connecting plate 1 which projects beyond the body 10 of the heat exchanger. The housing 5, which can be made from plastic, has an opening 50. The connecting plate 1 also includes openings 7 located along an outer edge so that the connecting plate 1 can be secured to the housing 5 adjacent to the opening 50 in the housing 5.

In the illustrated exemplary embodiment of FIGS. 1-3, the body 10 of the heat exchanger includes heat exchanger plates and fins 13. Two adjacent heat exchanger plates at least partially define a coolant duct. In each case, one duct 3 for the charge air to be cooled is situated between two pairs of heat exchanger plates. Fins 13 are arranged in the ducts 3. End chambers 2 for the coolant can be formed by shaping the heat exchanger plates.

In an exemplary embodiment, flat tubes and spaced-apart end chambers made from tubes are provided. In some embodiments, the tubes and spaced-apart end chambers can be constructed in a manner similar to the tubes and spaced-apart chambers described in German Patent Application No. DE 10 2005 058 769.0, the entire disclosure of which is incorporated herein by reference.

Arrows in FIGS. 2 and 3 indicate the flow in the coolant side and the charge air side (block arrows). As can be seen, the coolant flows via a connecting piece in the connecting plate 1 into an end chamber 2 and along a forward path and a parallel return path through the coolant ducts 4 before exiting the heat exchanger via another end chamber 2. The forward path and return path are in each case separated from one another by a flow partition (not shown).

In some embodiments, a flow connection exists between the forward path and the return path at the end of the flow partition, which is not shown in detail. The flow connection is considered to be a connection between two further end chambers 2 (not shown in detail) which are arranged at the opposite side of the heat exchanger. The end chamber length L is indicated in FIG. 2. It corresponds approximately to the height of the heat exchanger.

The housing 5 has two walls 51, 52 whose spacing relative to one another is not significantly greater than the length of the heat exchanger, as can be clearly seen in FIGS. 2 and 3.

FIG. 3 shows a section taken along line III-III in FIG. 2 in a plane which passes through the opening 50 below the connecting plate 1. In each case, one strip 20 has been formed on the opposing walls 51 and 52 of the housing 5. The strips 20 extend vertically with respect to the plane of the opening 50 (i.e., in the insertion direction of the heat exchanger into the housing 5). The length of the strips 20 corresponds approximately to the length of the end chambers 2. There can be free space between the end chambers 2 such that the strip 20 fits therein directly. In the illustrated embodiment, the cross section of the strips 20 has been designed to be slightly conical or so as to narrow in the direction of the center of the housing 5 and is therefore matched to the shape of the free space. The heat exchanger is accordingly fastened to a sufficient degree and in a stable manner merely by being inserted and by means of the previously described first fastening of the opening edge 50 to the connecting plate 1. The strips 20 substantially block the throughflow path of the charge air in the region of the end chambers 2 and therefore concentrate the charge air flow into the highly efficient region of the heat exchanger in which the fins 13 are situated.

The heat exchanger can also or alternatively have a certain degree of play or freedom of movement in the housing 5 to permit relatively large tolerances of the housing and/or of the heat exchanger.

Various features and advantages of the invention are set forth in the following claims.

What is claimed is:

1. A heat exchanger comprising:
   a heat exchanger body including two end chambers located at a first longitudinal end of the heat exchanger body for receiving a coolant and coolant ducts having fins, the end chambers being connected to the ducts;
   a housing defining an interior through which charge air flows and including an opening for receiving the heat exchanger body;
   a connecting plate secured to the housing; and
   a strip positioned in the interior of the housing between the end chambers and extending over at least a portion of a length of the end chambers, preventing charge air from traveling around the end chambers, and causing substantially all of the charge air to travel across at least one of the ducts and the fins.

2. The heat exchanger of claim 1, wherein the strip is a first strip, and wherein a second strip is positioned between two other end chambers located at a second longitudinal end of the heat exchanger body.

3. The heat exchanger of claim 2, wherein the first strip extends from a wall of the housing and the second strip extends from an opposite wall of the housing.

4. The heat exchanger of claim 1, wherein the strip extends in the insertion direction of the heat exchanger body with respect to the housing.

5. The heat exchanger of claim 1, wherein the strip extends into a free space between the end chambers and cooperates with the heat exchanger body to form a region closed to charge air flow such that the strip substantially prevents the charge air flow from entering and flowing through the region of the heat exchanger body.

6. The heat exchanger of claim 1, wherein the strip has a conical cross-sectional shape.

7. The heat exchanger of claim 1, wherein the heat exchanger is a charge air cooler.

8. The heat exchanger of claim 1, wherein the strip protrudes from a wall of the housing.

* * * * *